United States Patent
Reynolds, Jr.

(10) Patent No.: US 8,171,613 B2
(45) Date of Patent: May 8, 2012

(54) ELECTRICALLY INSULATED WEDGE THREAD CONNECTION

(75) Inventor: Harris A. Reynolds, Jr., Houston, TX (US)

(73) Assignee: Hydril Company, Houston, TX (US)

(*) Notice: Subject to any disclaimer, the term of this patent is extended or adjusted under 35 U.S.C. 154(b) by 966 days.

(21) Appl. No.: 11/952,538

(22) Filed: Dec. 7, 2007

(65) Prior Publication Data

US 2008/0084060 A1    Apr. 10, 2008

Related U.S. Application Data

(62) Division of application No. 11/215,155, filed on Aug. 30, 2005, now Pat. No. 7,326,015.

(51) Int. Cl.
*B23P 25/00*    (2006.01)

(52) U.S. Cl. ........... 29/458; 29/527.2; 411/424; 285/48; 285/336

(58) Field of Classification Search .............. 29/458, 29/527.2; 411/424, 901, 902, 914, 82.2; 285/48, 332.2, 332.3, 333, 336

See application file for complete search history.

(56) References Cited

U.S. PATENT DOCUMENTS

| 1,859,311 | A | * | 5/1932 | McEvoy, Jr. | 285/53 |
| 2,940,787 | A | * | 6/1960 | Goodner | 403/47 |
| 4,496,174 | A | * | 1/1985 | McDonald et al. | 285/53 |
| 4,559,974 | A | * | 12/1985 | Fawley | 138/172 |
| 4,589,187 | A | * | 5/1986 | Stone et al. | 29/458 |
| 5,131,688 | A | * | 7/1992 | Tricini | 285/53 |
| RE34,467 | E | * | 12/1993 | Reeves | 285/334 |
| 5,749,605 | A | * | 5/1998 | Hampton et al. | 285/48 |
| 7,387,167 | B2 | * | 6/2008 | Fraser et al. | 166/378 |
| 2006/0118191 | A1 | * | 6/2006 | Rice | 138/99 |

* cited by examiner

*Primary Examiner* — David Bryant
*Assistant Examiner* — Christopher Koehler
(74) *Attorney, Agent, or Firm* — Osha Liang LLP

(57) ABSTRACT

An electrically-insulative threaded connection includes a pin member having a pin thread and a box member having a box thread. An insulating composite layer is disposed between the pin thread and the box thread. The insulating composite layer includes an insulating fiber and insulating resin. The pin thread and the box thread are wedge threads. A method of making an electrically-insulative threaded connection includes forming a pin wedge thread on a pin member and winding a filament over the pin wedge thread. The filament is wetted with a resin, thereby forming a composite layer. The composite layer is cured and machined to mate with a box wedge thread.

6 Claims, 6 Drawing Sheets

ELECTRICALLY INSULATED WEDGE THREAD CONNECTION

CROSS-REFERENCE TO RELATED APPLICATIONS

This application is a divisional application of U.S. patent Ser. No. 11/215,155 filed on Aug. 30, 2005, and issued as U.S. Pat. No. 7,326,015 on Feb. 5, 2008.

BACKGROUND OF INVENTION

1. Field of the Invention

This invention relates generally to threaded connections with insulative properties. More specifically, the present invention relates to threaded connections made electrically insulative by a composite insulating layer containing insulating fibers. The threaded connections retain a high percentage of the mechanical properties of a similar, conventional and non-insulated threaded connection.

2. Background Art

There is a requirement in many widely varying applications for a threaded connection between two tubular steel members (such as pipe or tubular structural steel) that will carry high loads in tension, compression, bending, and torsion while providing electrical insulation between the two tubular steel members.

In various oilfield applications, for example, it is sometimes desirable to be able to electrically isolate a portion of a tubular string (e.g., drill pipe, casing or tubing) from the rest of the string. For example, electrical isolation may be used to provide a magnetic coupling for data transmission or to electrically isolate downhole instruments.

In oil and gas production, it is sometimes desirable to electrically isolate carbon steel pipe from Corrosion Resistant Alloy ("CRA") pipe used in the same string of pipe to prevent galvanic corrosion of the carbon steel pipe, particularly in a string of tubing used downhole in which the string is submerged in an electrolytic fluid such as brine.

In industrial piping applications, such as in refineries or chemical plants, it is often desirable to electrically isolate sections of pipe-work from one another. In the supply pipe to a gas meter, for example, it may be desirable to use electrically insulated pipe connectors to provide a controlled stop for electrical current that is passed along the supply pipe, for example to trace the path of the pipe. It may also be desirable to use electrically insulated connectors in an active cathodic protection system for a pipeline. Electrically insulated pipe connectors may be particularly valuable when metal pipes of different materials, such as steel and copper, are to be joined together in order to avoid galvanic corrosion, or to break stray currents induced in the piping from outside electrical sources, such as a nearby power transmission line.

In transmission of radio waves, it may be desirable to join together sections of tubular antenna structures with a mechanically strong threaded connection that also serves to electrically isolate one section of the structure from another.

In electrical power transmission, it may be desirable to electrically isolate one section of an electric power transmission tower from another section without losing a large percentage of the mechanical strength of a structural member which joins the two sections.

Those skilled in the art will understand that this list of applications for a tubular connection that provides electrical isolation between the members is not comprehensive, and that many other applications may benefit from such a connection.

In view of the above, several connections having electrical isolation exist in the prior art. Prior art electrically-insulated tubular connections divide into two groups: threaded and non-threaded. One type of non-threaded electrically insulated connection of the prior art is disclosed in U.S. Pat. No. 4,824,147 ("the '147 patent"). The '147 patent discloses an electrically insulated flanged pipe joint. Flanged joints are used extensively in chemical process plants and refineries. One connection disclosed as an embodiment of the '147 patent has two metal tubular parts, each having a flange at one end. The two tubular parts are coupled by a metal coupling sleeve surrounding the flanges and narrowing behind the flanges. A metal ring is located between both flanges, the outer diameter of which is greater than that of both flanges and which has its inner periphery in contact with the coupling sleeve. At both sides of the metal ring, an electrically insulating seal ring is disposed. In addition, an electrical insulation is disposed between the coupling sleeve and the first and second tubular parts.

U.S. Pat. No. 5,340,161 discloses another type of electrically-insulated flanged pipe connections with a tubular element inserted into a flange. One end of the tubular element is adapted to connect to a pipeline, and the other end is adapted to a ring-shaped electrically insulating element, which is positioned between the tubular element and the flange. Flanged or flange-like electrically insulated connectors for pipes or the like are also disclosed in U.S. Pat. Nos. 1,231,202, 3,441,293, and 3,503,632.

U.S. Pat. No. 4,496,174 discloses an electrically insulated drill collar gap sub assembly for a toroidal-coupled telemetry system with two essentially tubular members separated by a continuous gap. A dielectric material fills the gap to electrically isolate the first annular sub member with respect to the second annular sub member. A bearing member is positioned between the first member and the second member and is coated with a dielectric insulation to facilitate the formation of a drill collar gap sub assembly having a degree of structural and electrical integrity.

U.S. Pat. No. 4,739,325 discloses a "measurement-while-drilling" system that uses an electro-magnetic ("EM") telemetry link between down-hole instruments and ground surface instruments. One feature of the communication system is a combination of a sensing toroid and insulated gaps in the drill string interrupting electrical continuity so as to force all currents propagating in the strata and pipe string to flow through the axial opening of the sensing toroid via a conduction path dictated by considerations of electrical design rather than by mechanical constraints, thus enabling the effective electrical length of the drill string below the down-hole module to be optimized.

Threaded connections are generally of three types, defined by their characteristics at make-up: radial interference threads, shouldered connections, and wedge threads. As used herein, "make-up" refers to threading a pin member and a box member together. "Selected make-up" refers to threading the pin member and the box member together with a desired amount of torque, or based on a relative position (axial or circumferential) of the pin member with the box member.

In radial interference connections, at least one of the pin member and the box member is tapered such that, when the connection is made-up to a selected make-up, there is a prescribed amount of radial interference between the threads. FIG. 1A shows the thread-form of a typical radial interference connection. In FIG. 1A, the thread is an API "round" thread, which is used extensively in casing and tubing connections in the oilfield. The standard National Pipe Thread (NPT) is another example of a commonly used radial interference connection. This radial interference connection includes a male "pin" member 10 and a female "box" member 11. The pin member 10 has stab flank 12A, load flank 13A, crest 14A, and root 15A. The box member 11 has stab flank 12B, load flank 13B, crest 14B, and root 15B. Stab flanks 12A and 12B are so-called because they generally come into contact when the threaded connection is initially "stabbed" together to be made-up, and load flanks 13A and 13B are so-called because they carry tensile load exerted on a made-up connection within a string of casing hanging in a wellbore. Both pin and box members have taper 16 and thread lead 17.

At least one of the pin member and the box member of a radial interference threaded connection will be tapered, in order to generate radial interference at make-up. Amongst designers of advanced thread-forms, taper is conventionally measured in inches on diameter per one thread pitch (or revolution), and lead is conventionally measured in inches per one thread pitch. Note that lead is the inverse of the commonly used "thread pitch," which is denominated as threads-per-inch or TPI.

Generally, radial interference threads are made-up to a selected make-up such that there is a known radial interference between the pin member 10 and the box member 11. The radial interference can result in high contact stresses between the flanks of the pin threads and the mating flanks of the female threads.

It is well understood by those skilled in the art that radial interference connections are inexpensive to manufacture, but are very inefficient connections for the transfer of loads across the connection. Any axial tensile loads, axial compression loads, bending loads, or torsional loads applied to a made-up radial interference connection will result in radial stresses, which translate into hoop stresses. It is often the case, particularly for thin-walled pipe, that the load-carrying capacity of a radial interference threaded connection is limited by these accumulated hoop stresses. For this reason, the range of acceptable make-up torques for a radial interference connection is typically quite small. As a result, it is frequently a challenge in the field to make-up radial interference connections within the acceptable make-up torque range.

U.S. Pat. No. 5,749,605 ("the '605 patent") discloses an insulative threaded connection for metal tubulars to be placed in wells or for other metal pipe. An embodiment disclosed in the '605 patent is shown in FIG. 1B. The insulative threaded connection uses an API round thread profile similar to the profile shown in FIG. 1A. The insulative threaded connection has a pin member 10 and a box member 11. The insulative properties of the connection are provided by the combination of an electrically insulating layer 22 (a solid particle-loaded epoxy coating applied to the box member 11), and thread compound 23, which is a liquid epoxy resin used as thread compound. The thread compound 23 is cured after make-up of the connection. The insulating layer 22 contains particles at a selected loading such that the particles support load between the mated threaded joints. The '605 patent discloses that the insulative threaded connection is used in tubulars for improved transmission of electromagnetic signals to or from wells.

According to one embodiment disclosed in the '605 patent, insulating layer 22 is applied to the box member, the thread on pin member 10 is cut-back to compensate for the thickness of insulating layer 22, thread compound 23 is applied to the thread area, the connection is made-up, and the thread compound 23 is cured. The solid particles in layer 22 have a diameter less than the thickness of the metal removed from the coupling, and preferably less than about 40 percent of the thickness of the metal removed. In one embodiment, the particles have a diameter from about 5 micrometers to about 100 micrometers. One material suggested for the layer 22 is sold as IMPREGLON™ 26× (Impreglon, Inc., Georgia), which is an epoxy solution loaded with ceramic particles. The loading of the solid particles is high enough such that the concentration of particles between metal surfaces will be sufficient to support a substantial portion of the force causing metal-to-metal contacts to form in the threads. When connections having higher bearing or interference pressure are to be made insulative, it is preferable that the particles have high strength to resist crushing under the bearing pressure in the threads. The remaining force preventing metal-to-metal contact is supplied by the plastic matrix.

The '605 patent discloses that the particles are preferably ceramic and round or have a smooth surface. The load carrying capability of the insulative connection disclosed in the '605 patent is limited first by the efficiency of the radial interference connection, and second, by the compressive strength of the solids in the electrically insulating layer 22. Furthermore, because an epoxy is used as the thread lubricant to ensure sealing of the made-up threaded connection, this connection may not be broken-out once the epoxy thread lubricant has cured.

"Shouldered" threaded connections, as the name implies, will make-up until the connection bottoms-out on one or more shoulder surfaces. Shoulder surfaces may be located at the extreme end of the pin member (commonly referred-to as a "pin nose shoulder"), at the extreme end of the box member (commonly referred-to as a "box face shoulder"), or near the middle of the threaded connection (commonly referred-to as a "mid-thread" shoulder). Some threaded connections designs have a plurality of shoulders. Shouldered connections may use so-called "free-running" threads, in which only one set of flanks (either the "stab" flank closest to the distal end of the male connection, or the "load" flank, farthest from the distal end of the male connection) is in contact when the connection is made-up against the shoulder. Free-running threads may be "cylindrical", that is, untapered. Shouldered connections typically have a "determinant" make-up, that is, the connection will make-up until the shoulder surfaces contact, at which point increased torque will advance the make-up of the connection only very little. This is commonly referred to as a "step torque rise."

FIG. 1C shows a typical free-running thread-form of the type commonly used in shouldered connections in the oilfield. The thread-form shown in FIG. 1C is a buttress-type thread. Pin member 10 has a stab flank 32B, a load flank 33B, a crest 34A and a root 35A. Box member 11 has a stab flank 32B, a load flank 33B, a crest 34B and a root 35B. Both box and pin threads have a taper 36.

In the made-up condition shown in FIG. 1C, the shouldered threaded connection has gaps between the stab flanks 32A and 32B, the crest 34A and the root 35B, and the crest 34B and the root 35A. At make-up, there is contact between the box crest 34B and the pin root 35A.

The shoulders in shouldered connections are often at 90 degrees to the axis of the threaded connection (i.e. normal to the axis), but may also be at an acute angle to the axis of the connection. FIG. 1D shows a typical acute angle shoulder arrangement of the prior art. This connection has a pin member 10 and a box member 11. The connection shown in FIG. 1D is a so-called "two step" connection with two distinct cylindrical free-running threads: a small step 42 and a large step 43. Between the steps, each connection has a respective mid-thread shoulder, with pin shoulder 45 and box shoulder 44. When the connection is made-up, the pin member 10 and the box member 11 will not significantly resist torque until the respective mid-thread shoulders 44 and 45 come together, at which point the load flanks come into engagement. Note that at make-up, the stab flanks are not in contact in this connection. As a result, any compressive load imposed on the connection during make-up will be carried exclusively by the contact area between the mid-step shoulders 44 and 45.

The recommended make-up torque range for a shouldered connection is limited by the required resistance to "backing off" (unscrewing) while in service and the compressive strength of the shoulder or shoulders. Typically, the make-up torque range for a shouldered connection is much larger than that of a comparable radial interference connection. Typically, shouldered connections can be more efficient than radial interference connections, and often have other advantages such as good fatigue life and the ability to use an interference-type metal-to-metal seal due to the determinant make-up.

"Wedge threads" are characterized by threads, regardless of a particular thread form, that increase in width in opposite directions on the pin member and the box member. FIG. 2A shows a cross section of a prior art threaded connection with wedge threads that is disclosed in U.S. Pat. No. RE 34,467 ("Reeves") issued to Reeves, which is assigned to the assignee of the present invention and incorporated herein by reference in its entirety. On the pin member 10, the pin thread crest 201 is narrow towards the distal end of the pin member 10 while the box thread crest 203 is wide. Moving along the axis 104 (from right to left), the pin thread crest 201 widens while the box thread crest 203 narrows.

FIG. 2B shows the details of a wedge thread disclosed by Reeves. The threaded connection has been made-up to a selected make-up torque. The pin member 10 has a root 211, a stab flank 213, a load flank 214, and a crest 215. The box member 11 has a root 221, a stab flank 222, a load flank 223, and a crest 224. Note that at a selected make-up torque, Reeves discloses that the wedge thread has selected interference between the stab flanks 213 and 222, the load flanks 214 and 223, root 211 and crest 224, and root 221 and crest 215.

FIG. 2C shows the details of a wedge thread at make-up according to U.S. Pat. No. RE 30,647 ("Blose") issued to Blose, which is assigned to the assignee of the present invention and incorporated herein by reference. The pin member 10 has a root 211, a stab flank 213, a load flank 214, and a crest 215. The box member 11 has a root 221, a stab flank 222, a load flank 223, and a crest 224. A wedge thread built according to Blose and made-up to a selected make-up has a selected interference between stab flanks 213 and 222, and between load flanks 214 and 223, but has clearance between root 211 and crest 224 and root 221 and crest 215.

Wedge thread connections according to the Reeves may provide an excellent thread seal because all of the thread surfaces are in contact at a selected make-up, including the load flanks, stab flanks, and root-crest surfaces. This thread seal can provide a backup to other sealing mechanisms, or it can be used alone. Wedge threads as disclosed by Reeves have largely replaced those taught by Blose in part because the root-crest clearances taught by Blose may prevent the connection from being able to seal at high pressures.

Wedge threads are also extensively disclosed in U.S. Pat. No. 4,703,954 issued to Ortloff, U.S. Pat. No. 5,454,605 issued to Mott, U.S. Pat. No. 5,360,240 issued to Mott, and all assigned to the assignee of the present invention and incorporated herein by reference. While these wedge threads disclose wedge threads with a generally dovetail-shaped thread form, wedge threads do not have any particular thread form.

A wedge thread with a semi-dovetailed thread form is disclosed in U.S. Pat. No. 5,360,239 issued to Klementich, and incorporated herein by reference. A wedge thread with a thread form which includes a multi-faceted load flank or stab flank is disclosed in U.S. Pat. No. 6,722,706 issued to Church, and incorporated herein by reference. Each of the above thread forms is considered to be a "trapped" thread form, meaning that at least a portion of the corresponding load flanks and/or corresponding stab flanks axially overlap. A "trapped" wedge thread form will resist separation of the box and pin threads when the connection is made-up and under load. An "open" (i.e. not trapped) thread form with a generally rectangular shape is disclosed in U.S. Pat. No. 6,578,880 issued to Watts.

The rate at which the threads change in width along the connection is defined by a variable commonly known as a "wedge ratio." As used herein, "wedge ratio," although technically not a ratio, refers to the difference between the stab flank lead and the load flank lead, which causes the threads to vary in width along the connection. A detailed discussion of wedge ratios is provided in U.S. Pat. No. 6,206,436 issued to Mallis, and assigned to the assignee of the present invention. That patent is incorporated herein by reference in its entirety.

Currently, there is a lack of high-strength threaded connections with insulative properties and capable of repeated making-up and breaking-out.

SUMMARY OF INVENTION

In one aspect, the present invention relates to an electrically-insulative threaded connection. The threaded connection includes a pin member having a pin thread and a box member having a box thread. An insulating composite layer is disposed between the pin thread and the box thread. The insulating composite layer includes an insulating fiber and insulating resin. The pin thread and the box thread are wedge threads.

In another aspect, the present invention relates to a method of making an electrically-insulative threaded connection. The method includes forming a pin wedge thread on a pin member and winding a filament over the pin wedge thread. The filament is wetted with a resin, thereby forming a composite layer. The composite layer is cured and machined to mate with a box wedge thread.

In another aspect, the present invention relates to a method of designing an electrically-insulative threaded connection. The method includes designing a composite layer formed from an insulating fiber and an insulating resin. When cured, the composite layer has a selected dielectric strength. A wedge thread connection is designed with a selected gap between the male and female thread surfaces at a selected makeup, such that the selected gap has a desired dielectric strength when the composite layer is disposed in the gap.

Other aspects and advantages of the invention will be apparent from the following description and the appended claims.

DETAILED DESCRIPTION

The favorable mechanical characteristics of wedge threads provide an opportunity for a high-strength threaded connection with insulative properties. One particularly useful property of wedge threads, which typically do not have a positive stop torque shoulder on the connection, is that the make-up is "indeterminate" like a radial interference thread, meaning that a wedge thread can be successfully made-up to a wide range of make-up torques. How indeterminate the wedge thread make-up is depends mostly on the wedge ratio. Unlike a radial interference thread, the increase in hoop stress with increasing make-up torque is quite minor, as much of the torsional energy imparted into a wedge thread during make-up is dissipated axially through the thread flanks instead of being converted into hoop stress as in a radial interference connection.

The indeterminate nature of the make-up of wedge thread connections is particularly advantageous for repetitive make-ups of the threaded connection of the present invention, as the composite insulating layer may be slightly compacted by each make-up. Because of the indeterminate make-up, the threaded connection can compensate over a relatively broad range of selected make-ups for any reduction in the thickness of the composite insulating layer caused by the repetitive make-and break cycles.

In one embodiment, the current invention is incorporated into a short, permanently made-up insulating "sub" to be used in an oilfield tubular string in order to electrically isolate one section of the string from the rest of the string. A wedge thread is formed on a box member on one short joint of steel pipe, and a mating wedge thread is formed on a pin member on another short joint of steel pipe. Both wedge threads may be coated with a primer paint designed to affect a bond between the steel and a selected insulating resin.

Figure 6:
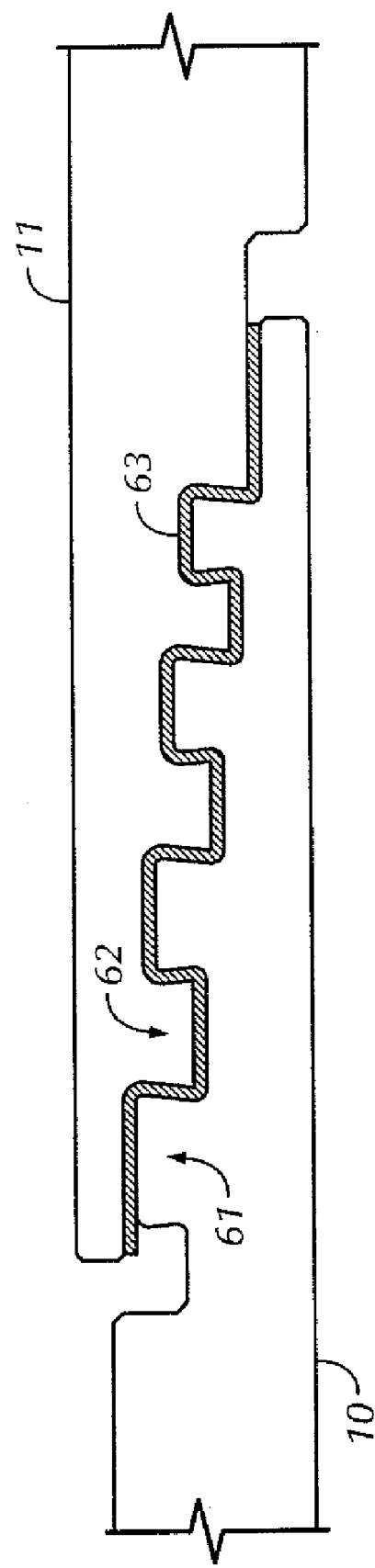
FIG. 6 shows a wedge thread connection in accordance with an embodiment of the present invention.

In FIG. 6, a threaded connection in accordance with an embodiment of the present invention is shown. The threaded connection includes a pin member 10 and a box member 11. The pin thread 61 and the box thread 62 are wedge threads. Those having ordinary skill in the art will appreciate that some of the advantages of the present invention may be obtained using non-wedge threads. A composite layer 63 is disposed between the pin thread 61 and the box thread 62. The composite layer 63 is formed from insulating fibers and resin. The composite layer 63 may be formed on either the pin member 10 or the box member 11, or be a separate component installed between the pin member 10 and the box member 11.

Many materials may be used to form a composite layer 63. For the insulating fibers, for example, fiberglass, nylon, boron, or polypropylene may be used. Carbon fibers are not preferable because of their conductive properties. Suitable insulating resins include various epoxies, ester (e.g. vinyl ester), and thermoplastics. Those having ordinary in the art will appreciate that other insulating fibers and resins may be used without departing from the scope of the present invention. Several methods are available for forming the composite layer 63 and are presented below.

Figure 1A:
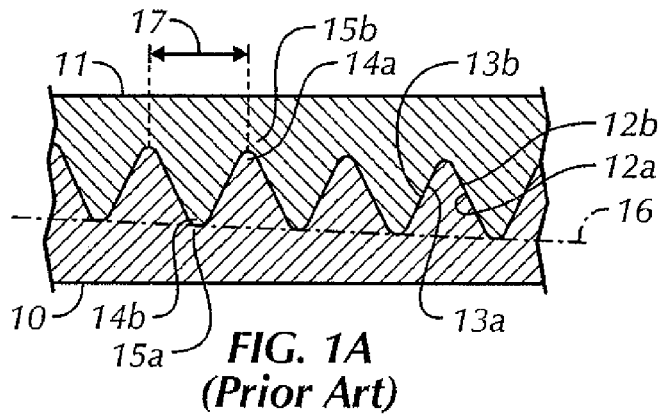
FIG. 1A shows a prior art "vee"-type thread used with oilfeld casing and tubing.
Figure 1B:
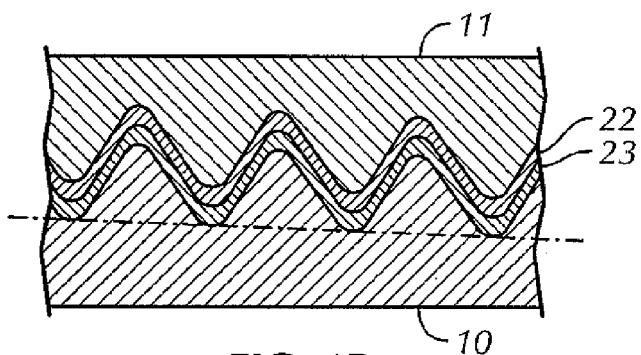
FIG. 1B shows a prior art electrically-insulated threaded connection.
Figure 1C:
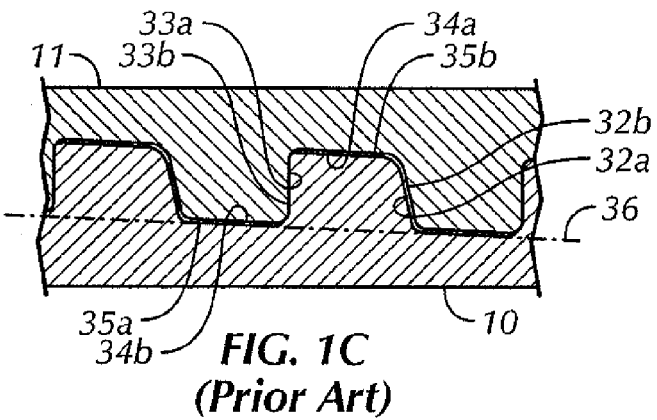
FIG. 1C shows a prior art "buttress" type thread form used with oilfield casing and tubing
Figure 1D:
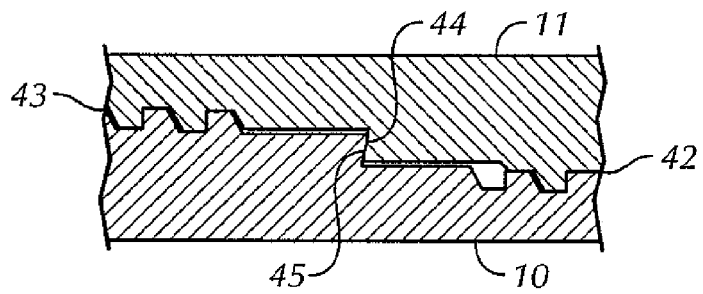
FIG. 1D shows a prior art shouldered threaded connection.
Figure 2A:
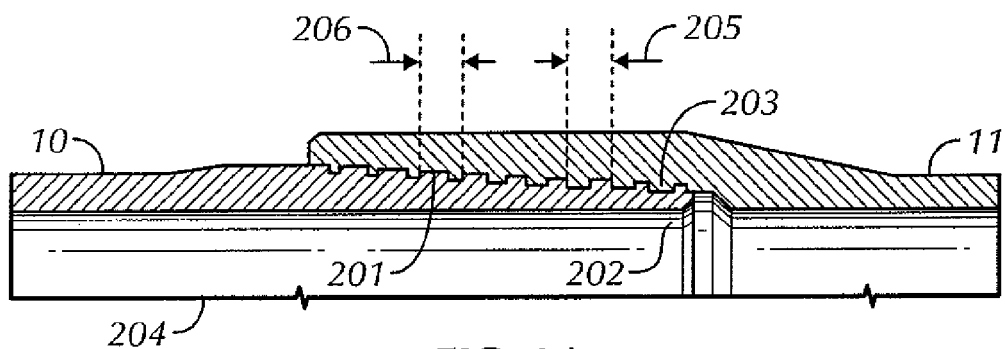
FIG. 2A shows a prior art wedge thread connection.
Figure 2B:
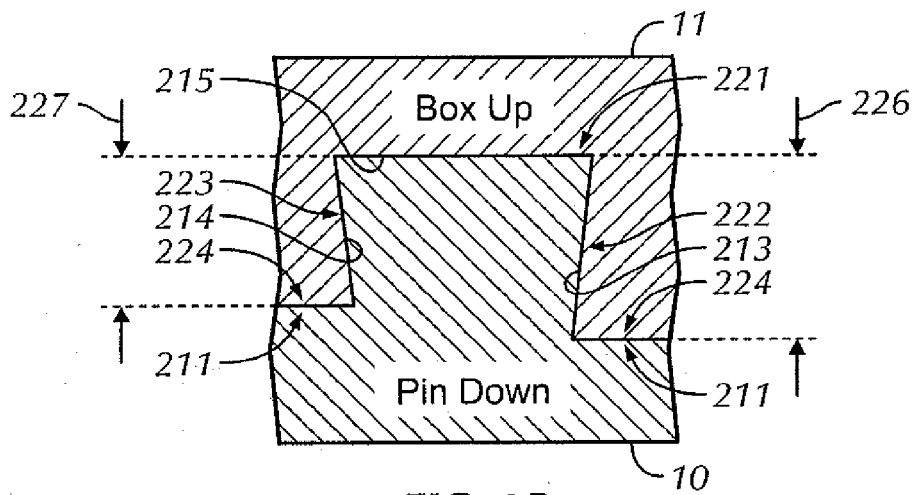
FIG. 2B shows details of the prior art wedge thread connection shown in FIG. 2A.
Figure 2C:
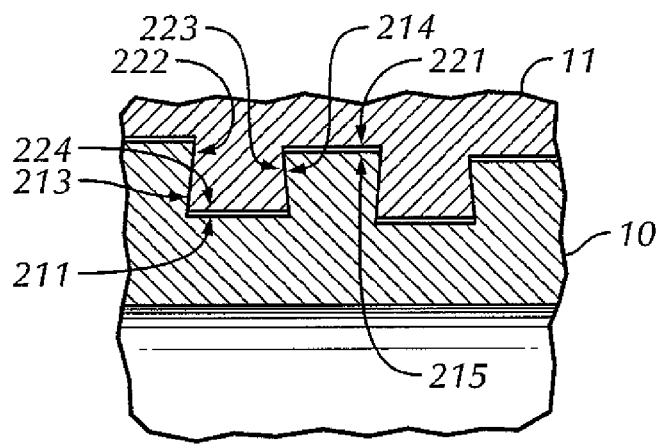
FIG. 2C shows details of a prior art wedge thread connection.
Figure 3A:
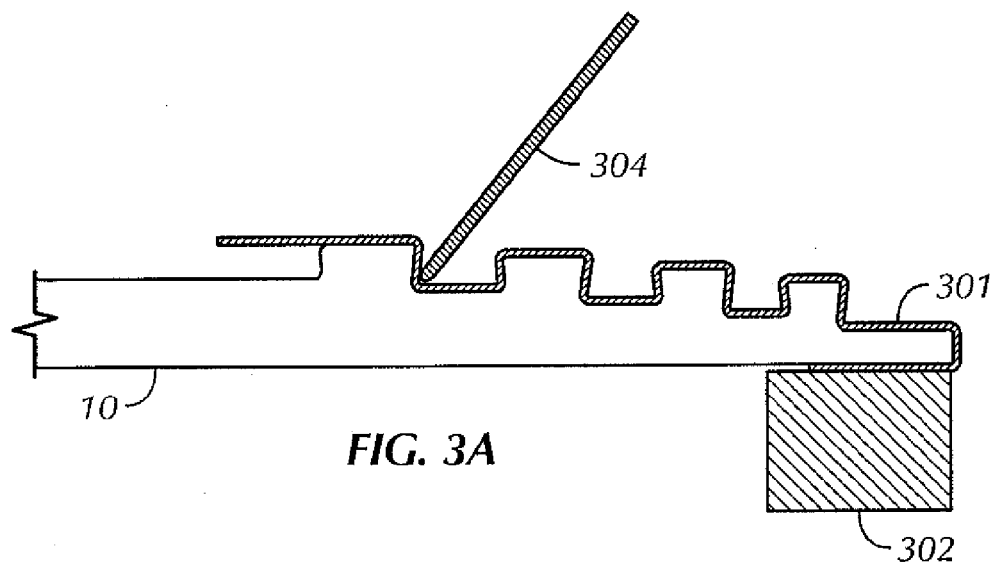
FIG. 3A shows the operation of forming a braided composite sock onto a wedge thread pin member, in accordance with an embodiment of the present invention.

Turning to FIG. 3A, a method of manufacturing a threaded connection with insulative properties in accordance with an embodiment of the present invention is shown. The pin thread on the pin member 10 is a wedge thread. A braided sock 301 sized for the threaded connection, such as those available commercially from A & P Technologies of Cincinnati, Ohio, is wetted with an epoxy resin and placed over the pin member 10. The braided sock 301 may be made of fiberglass or other insulating fiber. After wetting, the end of the braided sock 301 may be tucked-into the open end of the pin member 10 and secured by one of various means well-known to those skilled in the art, such as an inflatable packer or an internal clamping device 302. Starting at the open end of the pin member 10, the braided sock 301 may be progressively urged into the pin thread with an appropriate hand-tool 304, for example by drawing a small polyethylene rod or wooden tongue depressor along the thread root. Those having ordinary skill in the art will appreciate that the step of urging the braided sock 301 into the pin thread may be accomplished in an automated fashion if economically desirable.

As the braided sock 301 is drawn progressively into the pin thread root, the braided sock 301 will retract from the rear of the pin member 10. Care should be taken by the installer to ensure that there is an adequate length of the braided sock 301 available to accommodate this retraction. When the braided sock 301 is fully urged into the pin thread, the box member (not shown) may be made-up to the braid-covered pin member in a conventional manner, and the resin cured as required. The appropriate make-up torque can be easily determined experimentally by ensuring that the torque is high enough to prevent break-out of the connection, but low enough to insure that the fiberglass fibers are not damaged by excessive torque. Those having ordinary skill in the art will appreciate that the braided sock 301 may instead be installed on the box member; however, installation of the braided sock 301 on the pin member 10 is preferred because the pin thread is more accessible.

Alternately, if it is desired that the electrically insulative threaded connection be repeatedly made-up and broken-out, the electrically insulative layer may be molded onto a pin member and cured in place, and then this assembly may be made-up with a mating box member to form an insulating sub which may be later broken-out.

Figure 3B:
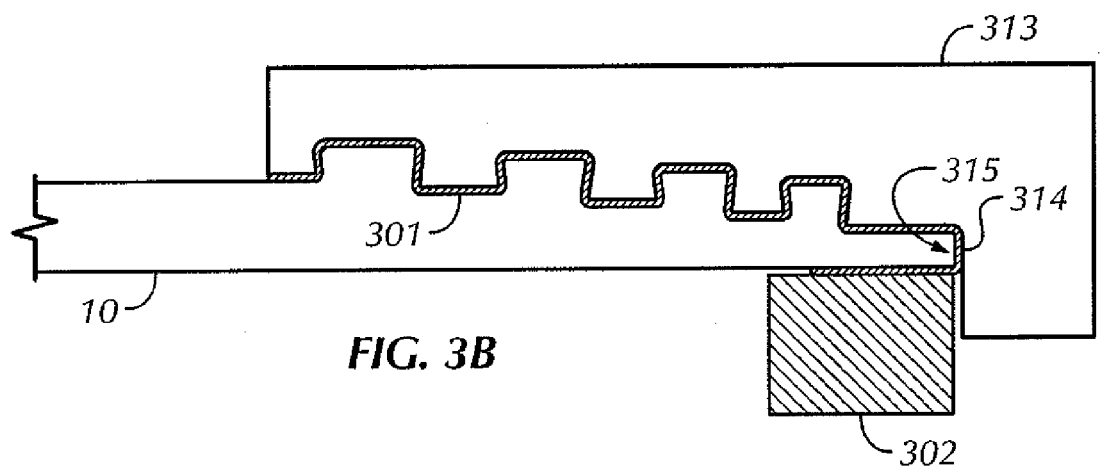
FIG. 3B shows the molding of a composite braided sock onto a wedge thread pin member using a shouldered mold, in accordance with an embodiment of the present invention.

In one embodiment, a wedge thread pin member is prepared with primer paint before installing a braided sock 301. Referring now to FIG. 3B, following the installation of the braided sock 301, a thread mold 313 is made-up onto the pin member 10 over the braided sock 301, and the composite layer (combination of the braided sock 301 and resin) is cured. After the composite has cured, the shouldered thread mold 313 is broken-out and the internal clamping device 302 is removed. The cured composite layer may be trimmed-back to the pin nose 315.

The thread mold 313 may have a shoulder 314 that limits the amount that the mold may be made-up onto the pin threaded connection; this ensures that the cured composite layer has a repeatable thickness. The thread mold may be made of a material that is appropriate to the cure method of the insulating resin. For example, for room-temperature cure epoxy resin formulations, the thread mold may be made of a thermoplastic which does not adhere to the cured resin, such as high density polyethylene ("HDPE"). For high-temperature cure resins, including some epoxies, the thread mold may be made of metal alloy with the surface treated with a conventional mold release compound. A metal-alloy mold may also be used with pre-impregnated tubular fiberglass braided sock (a "prepreg") using, for example, a thermoplastic resin such as polypropylene or polyamide, such as Nylon™ (E.I. DuPont de Nemours & Co. Wilmington, Del.). Care should be taken that the coefficient of thermal expansion of the mold material is very close to the coefficient for the pin member material. If not, the dimensions of the mold should be modified to accommodate different coefficients of thermal expansion.

In another embodiment, to ensure minimum resin content of the insulating layer, a short insulated tubular assembly is prepared according to the method shown in FIG. 3A, and the composite layer cured in place between wedge thread pin and box members made-up to a selected torque. After curing, the tubular assembly is heated above the softening temperature of the resin and torque applied to the connection, allowing excess resin to be squeezed-out of the connection. This method results in an increased fiber-to-resin ratio in the insulative threaded connections. This method is particularly well adapted to thermoplastic resins.

Figure 5A:
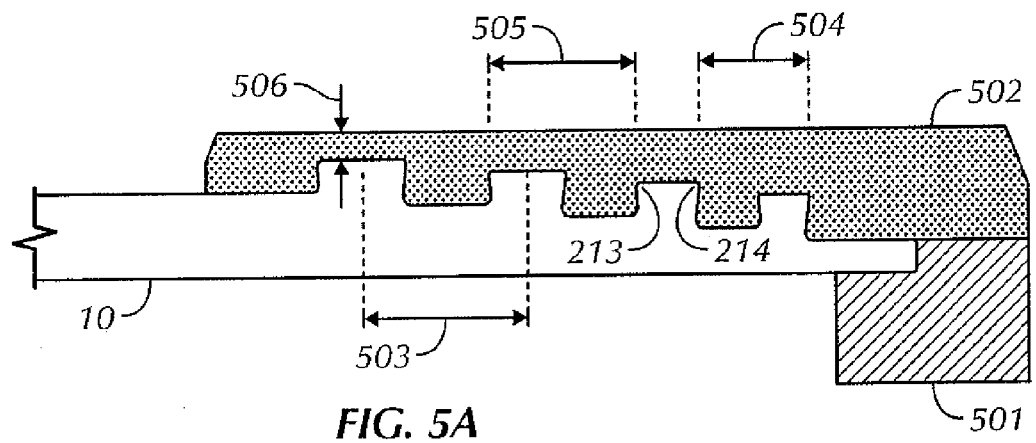
FIG. 5A shows a wedge thread pin member with a filament-wound composite layer applied to it in accordance with an embodiment of the present invention.

In another embodiment, the current invention may be manufactured by conventional composite filament winding techniques to produce an insulating layer consisting of essentially continuous fibers arranged substantially parallel to the flanks, the root surfaces, and the crests of the wedge thread. Referring to FIG. 5A, a pin member 10 has pin nominal thread lead 503, pin stab flank lead 504, pin load flank lead 505, and crest radii 507 and 508. Those skilled in the art of wedge thread connections will recognize that the pin stab lead 504 will be the smaller of the two flank leads, that the difference between the two flank leads is the "wedge ratio" as defined earlier, and that the pin nominal lead 503 is the average of the two flank leads.

The wedge thread pin member 10 may be painted with a primer to insure adhesion between the threaded connection and the composite insulating layer, and may be fitted with a pin nose cap 501 to accommodate filament-winding of wetted composite fibers over the threaded surface. The pin nose cap 501 may be secured to the pin nose of the wedge thread pin member 10 by any conventional means such as radial setscrews or an internal expanding clamping device.

Wetted insulating fibers 502 are conventionally filament-wound over the threaded surface of the wedge thread pin member and the outer surface of the pin nose cap 501. The fibers may be wound at the nominal lead, or they may be wound at the stab lead in one direction and the load lead in the other direction. Once the thickness of the filament winding over the last thread crest 506 is greater than the desired insulating layer thickness, the filament-wound composite may be cured in a conventional manner, for example, wrapped with heat-shrink tape and cured at a time and temperature suitable for the selected resin.

Figure 5B:
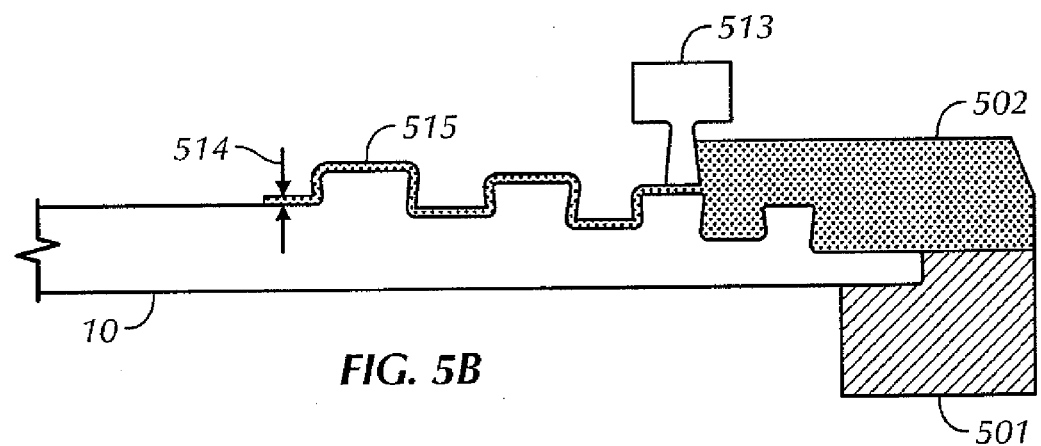
FIG. 5B shows a wedge thread pin member with a filament-wound composite layer being "chased" to form a composite insulating layer of a selected thickness in accordance with an embodiment of the present invention.

Referring now to FIG. 5B, after the composite filament winding 512 has cured on the wedge thread pin member 10, it may be machined (or "chased", in machining vernacular) to a selected uniform thickness 514 to form the composite insulating layer 515, with, for example, a carbide machining insert 513 shaped to follow the contours of the wedge thread in connection 510. Those skilled in the art will recognize that accurate machining of the composite insulating layer will require that the carbide machining insert precisely pick-up contours of the wedge-thread pin member; for this reason, it is preferred that the wedge thread pin member be machined, and the filament winding and thread "chasing" all be accomplished in one set-up on the same lathe or similar machine tool so that the tooling remains precisely indexed to the threaded connection.

A filament-wound embodiment will typically be more expensive than a molded embodiment because of the added machining required. However, a filament-wound threaded connection may offer increased strength and improved dielectric properties. The improved properties of a filament-wound threaded connection may result from the following: the insulating fibers can be arranged substantially parallel to the thread surfaces; the filament winding techniques allow for very tight compaction of the fibers and very "lean" composites (that is, with a very high fiber-to-resin ratio); and substantially all of the forces between the wedge threads (for example, between the root and crest surfaces, between the stab flank surfaces, and between the load flank surfaces) will be compressive loads on the composite insulating layer transverse to the winding direction of the insulating fibers. Those skilled in the art will recognize, however, that this embodiment may require larger-than-normal crest radii 507 and 508 to ensure the integrity of the composite insulating layer during handling of the threaded connection.

Another method of forming an insulating layer is to use a "chopper gun," which is typically used for making fiberglass molds. A chopper gun ejects short sections of fibers that are wetted with resin. In one embodiment, a chopper gun may be used to cover the pin threads or box threads with resin wetted fibers. A chopper gun provides an economical method for making an insulative threaded connection. The mechanical and dielectric properties would be a compromise between insulating particles and the continuous fibers described above.

Figure 4:
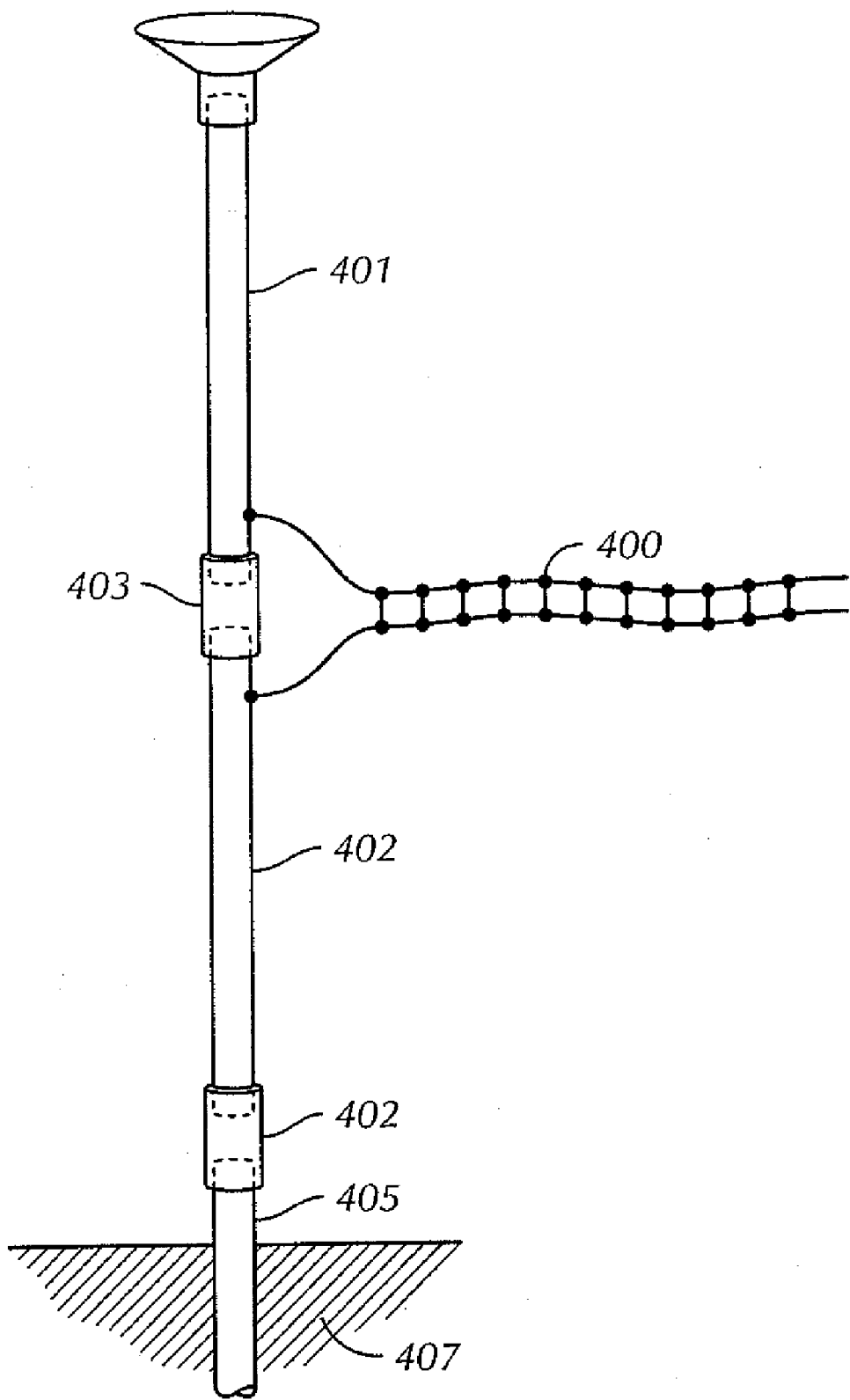
FIG. 4 shows a vertical dipole antenna constructed with threaded connections in accordance with an embodiment of the present invention.

In one embodiment, the current invention may also be used in the construction of radio frequency transmitting antennas. It is well-known in the art that large diameter "radiators" (the part of the antenna which actually radiates the radio frequency emissions during transmission) have much greater bandwidth than smaller diameter radiators. The use of large-diameter tubes for antenna radiators is usually avoided, however, as the insulators required may be very large or expensive or generally not capable of carrying large loads in both tension and compression. The threaded connection of the current invention may, for example, be used to construct a simple and very strong vertical dipole antenna for radio frequency transmissions with large diameter tubing as shown in FIG. 4, in which the antenna consists of only three tubular segments joined together with the threaded connection of the current invention. The upper dipole segment 401 is threadably coupled with a thread of the current invention by coupling 403 to the lower dipole segment 402. The lower dipole segment 402 is in turn threadably coupled with a thread of the current invention by coupling 404 to the base section 405 which is affixed in a foundation 407 or otherwise suitably located and affixed. The two dipole segments are fed by a transmission line 400 from the radio transmitter in the conventional manner. As an added benefit in the present invention, the insulative threaded connection may be designed to have a particular capacitance, depending mostly upon the section of composite materials and thickness of the composite layer.

Embodiments of the present invention may provide one or more of the following advantages. A composite layer formed from fibers provides an increased bearing area (relative to particles) to withstand stresses created between the pin thread and the box thread during make-up and use of the threaded connection. The increased bearing area helps to prevent the composite layer from indenting and allowing direct metal-to-metal contact between the pin thread and the box thread, which would short-circuit the threaded connection and defeat the insulative properties of the threaded connection. While achieving a reliable electrical insulation between the pin member and the box member, embodiments of the present invention sacrifice minimal strength.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of designing an electrically-insulative threaded connection, comprising:
    designing an insulating composite layer comprised of an insulating fiber and an insulating resin, wherein the insulating composite layer has a selected dielectric strength when cured;
    designing a wedge thread connection with a selected gap between male and female thread surfaces at a selected makeup, such that the selected gap has a desired dielectric strength when the insulating composite layer is disposed in the gap;
    forming a pin member having the male thread surface and a box member having the female thread surface;
    applying the insulating composite layer to at least one of the male thread surface and the female thread surface;
    arranging the insulating fiber substantially parallel to at least one of a flank, a root, and a crest of the wedge thread surfaces; and
    making up the pin member and the box member such that the selected gap is formed between the male and female thread surfaces.

2. The method of claim 1, wherein applying the composite layer comprises:
    winding the insulating fiber over the male thread surface;
    wetting the insulating fiber with an insulating resin, thereby forming the composite layer; and
    curing the composite layer.

3. The method of claim 1, wherein the insulating fiber comprises a plurality of insulating fibers.

4. The method of claim 3, wherein the plurality of insulating fibers comprise a braided sock, wherein the applying the composite layer comprises:
    depositing the braided sock over the male thread surface; and
    urging portions of the braided sock into the male thread surface.

5. The method of claim 4, wherein the applying the composite layer further comprises:
    wetting the insulating resin to the braided sock, thereby forming the composite layer;
    making up a thread mold with the pin member over the braided sock;
    curing the composite layer; and
    breaking out the thread mold from the pin member.

6. The method of claim 3, wherein the plurality of insulating fibers comprise chopped fiberglass.

* * * * *